US006933878B1

(12) United States Patent
Molyneux-Berry

(10) Patent No.: US 6,933,878 B1
(45) Date of Patent: Aug. 23, 2005

(54) WIDE BANDWIDTH RADAR

(75) Inventor: Robert Bewes Molyneux-Berry, Danbury (GB)

(73) Assignee: Bae Systems Electronics Limited, Farnborough (GB)

( * ) Notice: Subject to any disclaimer, the term of this patent is extended or adjusted under 35 U.S.C. 154(b) by 1826 days.

(21) Appl. No.: 06/820,251

(22) Filed: Nov. 20, 1985

(30) Foreign Application Priority Data

Nov. 24, 1984 (GB) .............................. 8429724

(51) Int. Cl.$^7$ ............................... G01S 7/28
(52) U.S. Cl. .................... 342/16; 342/18; 342/99; 342/111; 342/112; 342/115; 342/116; 342/131; 342/201; 342/202; 342/203
(58) Field of Search ....................... 342/59, 13, 16–19, 342/98, 99, 104, 108, 111, 112, 115, 116, 131, 135, 195, 201–203

(56) References Cited

U.S. PATENT DOCUMENTS

| | | | | |
|---|---|---|---|---|
| 3,161,870 A | * | 12/1964 | Pincoffs | ........................ 342/59 |
| 3,500,404 A | | 3/1970 | Anderson et al. | |
| 4,017,855 A | | 4/1977 | Buck et al. | |
| 4,041,489 A | * | 8/1977 | Lewis | ......................... 342/201 |
| 4,197,540 A | * | 4/1980 | Riggs et al. | ................. 342/201 |
| 4,319,242 A | * | 3/1982 | Lewis | ....................... 342/59 X |
| 4,443,799 A | * | 4/1984 | Rubin | ......................... 342/201 |
| 5,646,623 A | * | 7/1997 | Walters et al. | ............... 342/129 |
| 6,771,205 B1 | * | 8/2004 | Barton et al. | .................. 342/13 |

FOREIGN PATENT DOCUMENTS

| | | |
|---|---|---|
| EP | 0031442 | 7/1981 |
| GB | 1455157 | 11/1976 |
| GB | 2085251 | 4/1982 |

* cited by examiner

Primary Examiner—John B. Sotomayor
(74) Attorney, Agent, or Firm—Crowell & Moring LLP

(57) ABSTRACT

A wave-form generator drives a number of microwave generating devices each operating at different frequency bands. The output of each microwave generator is connected to its own transmission channel of limited bandwidth which contains all the non-linear components necessary for transmission such as an amplifier, T/R switch, rotary joint and beam switch. These individual channels are finally combined onto a common wideband channel which contains only substantially linear components such as a single waveguide and the antenna itself. Because of the isolation between channels there is little or no opportunity for the generation of harmonics or intermodulation distortions which would otherwise occur in a transmitter capable of operating over a very wide bandwidth.

5 Claims, 2 Drawing Sheets

WIDE BANDWIDTH RADAR

BACKGROUND OF THE INVENTION

This invention relates to a Doppler radar designed to operate over a wide bandwidth.

For many years it has been considered desirable for military radars to be able to vary their nominal radar carrier frequency of transmission as widely and as agilely as posible in order to elude jamming and other hostile attentions. Such radars have hitherto generally been restricted to an agile range, or bandpass, of less than one octave, and are able generally to transmit on only one radar carrier frequency at once. These restrictions apply because known efficient means of amplification and control of radar frequency power tend to produce harmonic distortions and intermodulation products (especially if more than one radar carrier frequency is amplified simultaneously), detrimental to the radar and to other band users. Conventional radars employ waveguide components with sufficiently restricted bandpass characteristics so that the unwanted harmonic distortions and intermodulation products are not transmitted to any serious degree. Wideband systems, on the other hand, will transmit many of the unwanted signals. Only those radars which are provided with two separate antennas have hitherto been generally able to transmit and receive simultaneously.

Modern radar systems are required to do more than detect the presence of reflecting objects (targets) in the path of the radar beam as directed by the antenna. Modern radars are additionally required to determine quantitative information, e.g., about the nature, position and velocity of each target detected. The required information may be computed by quantitative comparison of the radar echo signals reflected from targets with the form of the radar transmission signals. This comparison and the computation of the required information is generally termed "Doppler processing."

It is well known that Doppler processing yields target information which is qualified by a degree of uncertainty and ambiguity, in that each computation of a target attribute yields, in general, more than one value. It is also possible to 'lose' actual targets or 'find' non-existant ones. For these reasons it is generally necessary to confirm all measurements computed by Doppler processing by taking a second 'look' in each beam direction, using different radar transmission signals so that the Doppler processing computations are sufficiently different to make it unlikely that any identical ambiguities and errors result from both looks. Where there are initially many ambiguities, a third or even a fourth look may be required before there can be high confidence that all targets present in the radar beam have been detected and that all relevant information has been accurately and unambiguously computed. Since a conventional radar can use only one radar transmission at a time, multiple looks must take place sequentially so additional time must be spent searching each beam direction. A conventional Doppler radar therefore generally requires more time, to search a given area of sky, than a simple non-Doppler radar of otherwise comparable characteristics.

SUMMARY OF THE INVENTION

According to the invention there is provided a radar comprising individual sources of microwave energy designed to operate over different frequency bands each of one octave or less spaced so that in combination the sources are capable of operating over a frequency band of more than one octave; a wave-form generator connected to the individual sources so as to cause the latter to generate simultaneous identical wave-forms in their respective different bandwidths; individual channels, preferably of relatively restricted bandwidth leading from the respective sources and having (through necessity rather than desire) relatively non-linear characteristics; means for combining outputs from the individual channels onto a common channel having relatively linear characteristics and preferably a relatively wide bandwidth; and an antenna at a downstream end of the common channel for transmitting, in a single beam direction, a signal formed by the combined outputs of the individual sources.

Because each source of microwave energy and its associated channel is designed to operate over one octave or less there is little or no opportunity for the transmission of unwanted harmonics in the individual channels. Furthermore, because the individual channels are separate, there is no opportunity for intermodulation between channels in components having relatively non-linear characteristics. Such components having relatively non-linear characteristics include for example amplifiers, transmit/receive switches, some rotary joints and imperfect junctions between waveguides.

The wave-form generator may be a pulse generator which drives the individual microwave sources to produce simultaneous pulses at different frequencies within their individual frequency bands. The invention is however also applicable to radars in which the wave-form generator could for example be designed to modulate the frequency of the energy generated in each source as well as its amplitude.

Similar considerations apply to the receiving section of the system as to the transmission section. Means is therefore preferably included for separating a received signal into separate channels carrying components in different frequency bands. These separate channels lead to individual receivers designed to operate in the respective different frequency bands. The transmitters and receivers preferably share the same "common" channel and the same antenna. In such arrangements means such as a circulator or T/R switch is preferably included to prevent energy from a transmitter from passing directly to an associated receiver.

The ability to transmit simultaneously on two different frequencies is of particular value where the receiver includes Doppler processing equipment because it enables ambiguities in the Doppler processing to be resolved. The invention is therefore of particular application to systems which include such Doppler processing equipment.

BRIEF DESCRIPTION OF THE DRAWINGS

One way in which the invention may be performed will now be described with reference to the accompanying drawings in which:—

DETAILED DESCRIPTION OF THE PREFERRED EMBODIMENT

Figure 1:
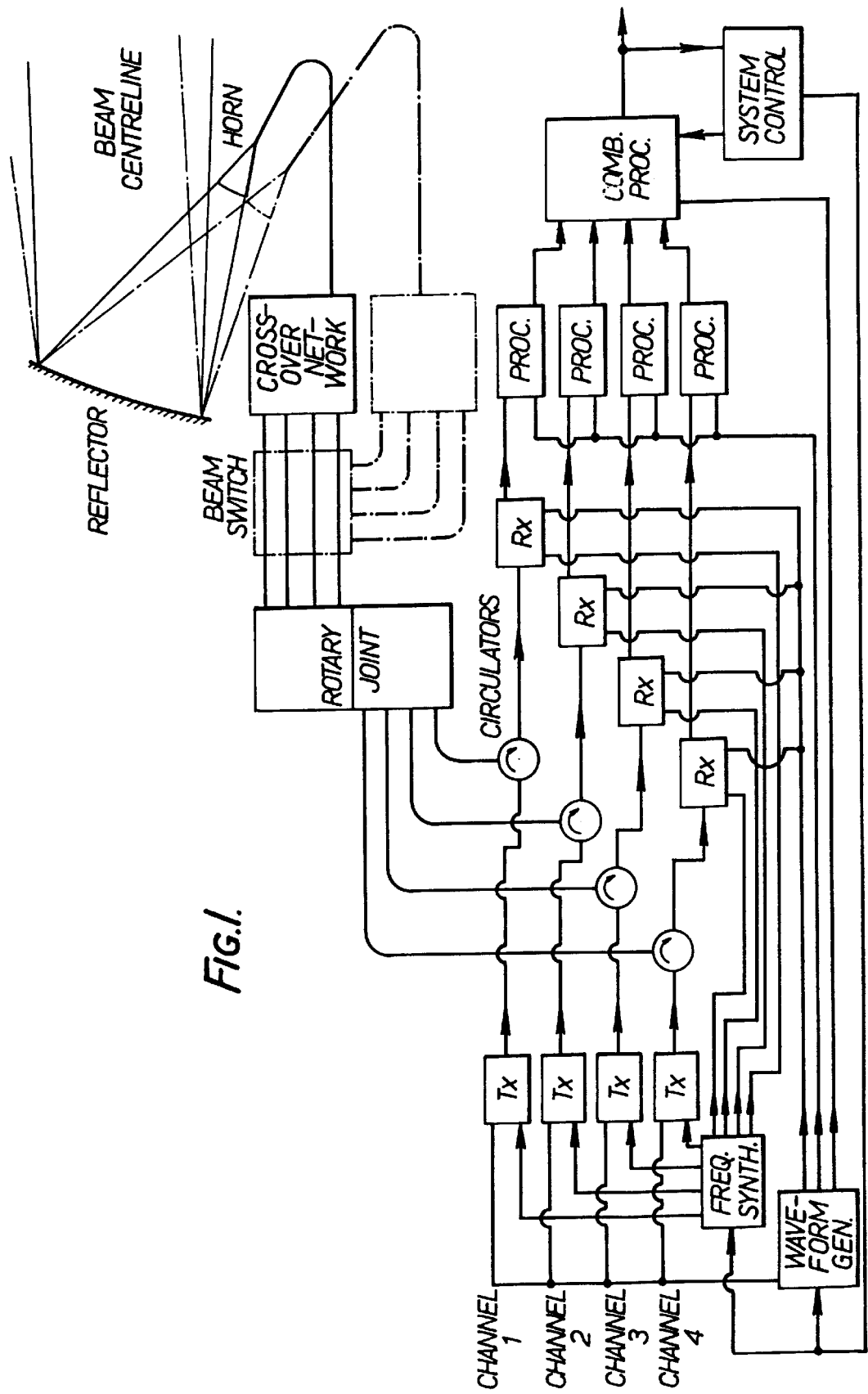
FIG. 1 is a block diagram of a Doppler radar system constructed in accordance with the invention.

Referring firstly to FIG. 1 the illustrated radar system has a plurality of separate channels for the amplification of signals to be transmitted, and for the reception and Doppler processing, or alternative means of signal processing, of radar echoes. A single antenna 10 is provided for transmission and reception of all channels. The antenna is so constructed that the plurality of radar beams corresponding to the plurality of separate channels are superposed and co-directed so as to form in effect a single beam carrying the transmissions of, and collecting the echoes for, all channels. The antenna is also constructed so that portions of its structure which may be exposed simultaneously to signals from a plurality of channels include no components or materials having non-linear characteristics likely to cause harmonic or intermodulation distortions to such signals. An appropriate type of antenna is explained below.

Any plural number of channels may be provided, but arrangements with two, three or four channels only are generally more cost-effective than arrangements with a larger number of channels. FIG. 1 shows the block diagram of a typical arrangement having four channels.

Each channel (receiving and transmitting) is constructed to carry a specific and limited band of radar frequencies. The radar frequency bandpass of each channel is less than one octave, and typically less than half an octave. The four individual frequency band signals are generated in a frequency synthesizer 11 which feeds the four signals to respective microwave transmitters 12.1–12.4 wherein they are modulated with the output signal from a common wave-form generator 13. The wave-form generator 13 causes the transmitters 12.1–12.4 to generate simultaneous identical wave-forms in their respective bandwidths, and in the circuit of FIG. 1 is a pulse generator which drives the individual transmitters or microwave sources 12.1–12.4 to produce simultaneous pulses at different frequencies within their respective individual frequency bands. The component parts of each channel may be of conventional type and are designed to carry radar frequency signals within the intended bandpass of the channel only. The radar frequency signals for transmission in the respective channels may be amplified—e.g., in a respective travelling-wave tube amplifier—and transmitted along a conventional waveguide via a respective circulator 14.1–14.4 to a crossover network 15 which directs radar transmission signals in any channel 1–4 into the single antenna 10. Radar echoes received by the antenna 10 are allocated between the channels 1–4 by the crossover network 15 and are passed by the respective circulators 14.1–14.4 to the respective receivers 16.1–16.4 which may be of conventional superheterodyne type and which also receive the respective outputs from the frequency synthesizer 11 and the output of the pulse generator 13. Other conventional components, —e.g., protection devices, may be added as required. The detected signal (baseband) outputs from each receiver 16.1–16.4 are passed to respective Doppler processing units 17.1–17.4. (one for each channel) which likewise receive the output of the pulse generator 13, and the target measurements computed by each of the Doppler processing units 17.1–17.4 are passed simultaneously to a combining processor 18 which compares and confirms the individual sets of measurements in such a way as to resolve or reduce ambiguities and inaccuracies. Confirmed target detections and measurements are available at the output of the combining processor 18 for display or further data processing according to conventional practice. A system control 19 is provided for overall control and sychronization of the system.

The several channels provided are generally similar but each differs from the others in that its useful bandpass encompasses a different band of radar frequencies. The bandpass ranges of the several channels may be substantially contiguous, so that the bandpass of the whole radar system encompasses a substantially unbroken range of radar frequencies representing the sum of the bandpass ranges of the constituent channels. Alternatively the bandpass ranges of the several channels may be discontiguous so that the overall bandpass of the system is greater than the sum of the band pass ranges of the constituent channels, but certain intermediate bands of radar frequencies cannot be used. It is not, however, generally useful to overlap the bandpass ranges of the constituent channels except to a small extent related to imperfect performance of the crossover unit.

The arrangement described above enables the overall bandpass of the radar system to be in excess of one octave whilst all imperfectly-linear processes concerned with amplification and reception can employ conventional components and techniques, and take place in circuits with sub-octave bandpass characteristics, unable to support and propagate most harmonic and intermodulation distortions.

The crossover network 15 operates on the frequency selective principle in that it offers a clear, low-loss bidirectional path between the antenna 10 and each channel 1–4 only for radar frequencies within the intended bandpass range of each particular channel.

Figure 2:
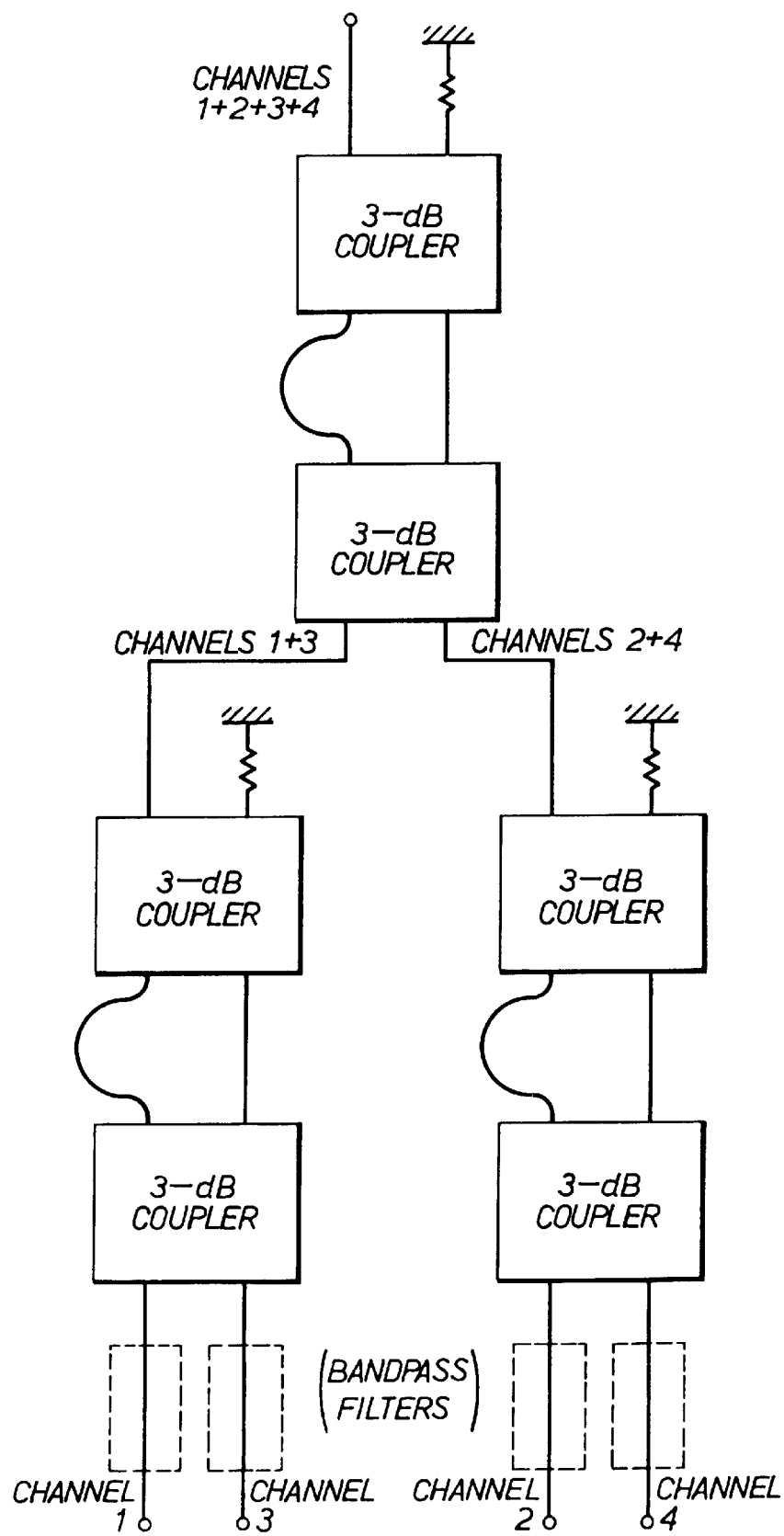
FIG. 2 is a block diagram of a crossover network indicated on FIG. 1.

One suitable known type of radar-frequency crossover network is shown diagramatically in FIG. 2. Each stage of the network consists of two unequal lengths of waveguide 21, 22 connected between a pair of 3-db couplers 23, 24 which may be of any known type provided that they are designed to have the required bandpass and do not include non-linear components or materials. Two-such stages, comprising three units, are required for a 4-channel radar system. The sequences of partition of channels 1, 2, 3, 4 (in ascending order of frequency) shown in FIG. 2 is generally convenient though other sequences are possible. Where the overall bandpass of the four channels exceeds an octave, all waveguide components shown diagramatically in FIG. 2 may be realised in ridged waveguide of constant section. Connections to the individual channels may be via smooth transitions to ordinary rectangular waveguide of sections appropriate to the bandpasses of the individual channels.

The crossover network shown in FIG. 2 gives low insertion loss, except at the extremes of channel bandpass, and good isolation between channels. Isolation between channels can be further improved, to an arbitary degree, by adding bandpass filters 25 in series with the individual channels. The whole network, including the bandpass filters, may be conveniently realised in integral flat form, suitable for stacking and appropriate to complex applications of the invention having multi-beam antennas.

The most appropriate form of antenna 10 will depend on the application. A form of antenna will now be described which is suitable for ground-based applications requiring a rotating antenna having one or more beams whose positions are stacked in elevation. The invention is not limited to this type of application or antenna.

The antenna to be described is a rotating horn-fed reflector substantially of known and conventional design. Where the beam is required to have only one position in elevation, only one horn 26 is provided. Where several stacked beam positions are required, an appropriate number of similar horns are provided, stacked in conventional manner to feed the common reflector 27. Each horn may be constructed from ridged waveguide to have a bandpass capability equal to the overall bandpass of the radar system. The horn 26 is dimensioned and positioned to illuminate the whole reflector 27 at the lowest radar frequency to be used. An 'offset' position is preferred, especially if several horns are stacked in order to provide alternative beam directions in elevation, so that the radar beam is not obscured by the horn(s).

In each beam direction the centre-lines of the four superposed beams (one per channel) will be closely coincident because all are radiated by the same horn 26. However the angular extent (beamwidth) may tend to differ acording to the radar frequencies in use, higher frequencies tending to be concentrated into narrower beams. For some applications this may be advantageous but in general it is desirable instead to superpose beams of equal width so that targets whose attributes are to be computed simultaneously within different channels can be found simultaneously within the relevant beamwidths. One relatively simple known method of achieving an antenna beamwidth which is substantially invariant with frequency is to defocus the beam, e.g., by positioning the horn closer to (or further from) the reflector than the postion of optimum focus. This tends to broaden the beam at all radar frequencies, but the broadening effect is proportionately greater with high radar frequencies at which the beam would otherwise be relatively narrow. Other methods are known to those skilled in the art of radar antenna design by which a frequency invariant beamwidth may be achieved with a good beam profile.

A waveguide rotary joint 30 must be provided in order to connect the antenna horn 26, rotating with the antenna 10, to the static parts of the radar system. Single rotary joints 30 capable of more than an octave of bandpass are commercially available but it is preferable to use four conventional rotary joins (one per channel) individually of sub-octave bandpass. The crossover network 15 (1 set per horn) thus rotates with the antenna 10 and is connected between the rotary joints 30 and the horn 26. Where several antenna horns 26, 26' are used to give stacked antenna beams, appropriate additional crossover networks 15', and a beam switching system 31, which rotates with the antenna 10, must be provided.

Where the antenna 10 has a single horn 26, and thus provides only a single set of superposed beams, fixed in elevation, the four channels of the rotary joint 30 can remain connected to the corresponding channels 1–4 of the radar system via the four circulators 16.1–16.4, as in FIG. 1. Where, on the other hand, several stacked horns are provided, the radar system channels must be switched to the appropriate horns in order to search in the desired beam elevation positions. Known, efficient, methods of beam switching require non-linear components so beam switching is conveniently carried out in the individual channels, typically between the rotary joints and the crossover networks. Four conventional sub-octave beam switching units must therefore be provided. In addition to minimising harmonic and intermodulation distortions, this provides the facility for using the four radar system channels simultaneously on any single antenna elevation beam or severally on different antenna elevation beams in any convenient combination provided that the combining processor 18 (FIG. 1) is controlled appropriately. For example, two channels could be used to search one beam elevation, and the other two channels used simultaneously to search another beam elevation. In this case the combining processor 18 will first correlate computed target measurements in pairs of channels, rather than in all channels together.

However, for targets detected within the overlap area of two adjacently stacked beams, it is additionally possible to compute by interpolation the precise elevation angles to such targets, and thence to accurately compute target height. If a beam elevation is searched by only a single radar system channel, conventional sequentially-differenced transmissions will be necessary to resolve Doppler processing ambiguities and errors. Thus, whereas the arrangement of FIG. 1 is appropriate to exploitation of the invention in its basic form (arrangements having only two or three channels are implicit in FIG. 1) fuller exploitation is possible when the radar wave-forms transmitted in each channel can be controlled independently, and the received radar signals appropriately processed and combined.

The illustrated system always transmits pulses in all the channels during the same time envelopes. It may however be desirable to eliminate certain ambiguities and/or blind spots, to include a facility enabling some of the pulses in the pulse train transmitted by one channel to be displaced in time relative to those of another channel. This allows one channel to be receiving whilst another is transmitting and can eliminate certain ambiguities and/or blind spots. It may be desirable in some circumstances to time the pulses in the different channels so that no co-extensive pulses are transmitted in the different channels. The ease with which a radar, constructed in accordance with the invention, can be adapted to do this if and when required is a notable advantage but it will be appreciated of course that, when so adapted, it will no longer contain the essential elements of the invention.

Although a radar system built according to the invention cannot concentrate its total transmission power into a single channel, it can concentrate its total power into coincident beams and thus onto a single target or group of targets. Detection capability is therefore not inferior to that of a conventional system having the same total power and antenna beamwidth. Moreover, Doppler processing ambiguities and errors can generally be resolved by concurrent looks, and the probability of 'losing' a target is much reduced. A further advantage is that the radar is resistant to jamming by virtue of having available four channels, using widely spaced radar frequencies (each potentially agile within the channel bandpass) so that all four channels must be jammed simultaneously if the radar is to be disabled. Since the antenna sidelobe (beam leakage) pattern is, in general, an irregular function of azimuth, elevation, and radar frequency, it is unlikely that all channels can be simultaneously jammed from a given direction even if a suitable multiplicity of jamming equipment is applied to the task.

Because it is in general unnecessary to use all channels for a single radar task, the system may be readily adapted to the simultaneous performance of different tasks, especially where the antenna is provided with stacked horns or other means by which all channels are not simultaneously restricted to a single beam direction. Simultaneous performance of disparate functions is, of course, subject to the restrictions noted above concerning simultaneous transmission and reception. It is, however, generally practical to perform specialised radar tasks, such as the tracking of known targets, without interrupting the surveillance capability of the radar, or to allocate one or two channels to communication—e.g., with a guided missile—and the other channels to radar functions. It will be clear that such division of function requires (known) equipment additional to that shown diagramatically in FIG. 1.

The invention is not limited to the type of antenna described above. Application of the invention to different classes or radar (e.g. airborne) clearly requires quite different types of antenna. In addition to obvious variants (e.g., rotating/non rotating; reflector/direct horn) three alternative antenna arrangements may be suited to particular applications.

Firstly, an arrangement without a crossover network 15 (though with a bandpass filter 25 in each channel) in which each channel feeds a conventional direct horn antenna, the (typically 4) horns being positioned adjacently and co-directed. The horn apertures are dimensioned to give equal beamwidths so that the beams are effectively coincident at a distance from the antenna. This arrangement is simple, effective and easily engineered but since the apertures of the horns are not common to all channels, the total aperture required is increased especially where the number of horns required is multiplied by requirements for beam switching or steering. This arrangement is therefore useful only at relatively high radar frequencies where the horns can be individually small, and where the provision of high-power broadband waveguide components is relatively difficult.

The second arrangement is similar in that separate horns are used for each channel, but in this case with a reflector. A single conventional horn is used for one channel (typically the channel carrying the highest radar frequencies) and (with the reflector) defines the centreline of the superposed beams.

Each other channel is split equally between a pair of horns positioned symmetrically on either side of the central horn so that the split beams combine at a distance from the antenna into a single beam on the required centreline. The apertures of the horns are dimensioned so as to equalise the beamwidth-s of the different channels. A maximum of 4 channels (7 horns) can be accommodated without undue loss of beam profile or sidelobe performance. This arrangement uses a common aperture but is not conveniently adaptable for stacked beams. When an offset geometry is used, so that the cluster of horns does not obscure the beam, the assymetry introduced by the angular offset must be compensated by introducing an assymetry in the relative positions of the paired horns, in order to maintain a common centreline for all superposed beams.

The third alternative antenna arrangement is a passive broadband phased array fitted with crossover networks whereby the beam forming and steering (typically in elevation) is performed separately in each channel so that conventional means (which may involve non-linear components and materials) can be used, and so that the individual channels may, if desired, be independently directed. Although this type of antenna is foreseen in principle, advances in design technology are essential to its efficient realization with a wide overall bandpass, so it will not be described further herein.

I claim:

1. A Doppler radar, comprising:
    a plurality of individual sources of microwave energy designed to operate over different frequency bands each of one octave or less spaced so that in combination said sources are capable of operating over a frequency band or more than one octave;
    a pulse generator means connected to the individual said microwave sources for driving the individual said microwave sources to produce simultaneous pulses at different frequencies within their individual said frequency bands;
    a first plurality of individual channels leading from the respective said sources and having relatively non-linear characteristics;
    a common channel having relatively linear characteristics;
    an antenna means connected to one end of said common channel for transmitting a signal fed thereto via said common channel in a single beam direction and for receiving the transmitted signal after reflection from a remote target and feeding the received signal to said common channel;
    a plurality of individual receivers designed to operate in the respective said different frequency bands;
    a second plurality of separate channels for carrying signal components in the respective said different frequency bands and connected to the respective inputs of said plurality of receivers;
    means, connected to the other end of said common channel, for combining the outputs from the individual channels of said first plurality of separate channels onto said common channel and for separating a received signal in said common channel into said different frequency bands and feeding same to the respective individual channels of said second plurality of channels; and, velocity deduction means connected to receive an output from each receiver and to deduce therefrom a Doppler frequency shift of that component of the received signal in the appropriate frequency band.

2. A Doppler radar according to claim 1 including means for combining outputs from said velocity deduction means to reduce any ambiguities in the Doppler frequency shift.

3. A Doppler radar system as defined in claim 1 wherein said velocity deduction means is further connected to receive the output of said pulse generator means.

4. A Doppler radar as defined in claim 1, wherein said velocity deduction means includes a plurality of Doppler processing circuits, each connected to receive the output of a respective one of said receivers and the output of said pulse generator means.

5. A Doppler radar as defined in claim 1 wherein said means for combining and for separating includes: a plurality of circulators, each having a first port connected to a respective one of said first plurality of separate channels, a second port connected a respective one of said second plurality of separate channels, and a third port; and a crossover network connected between each of said third ports and said common channel.

* * * * *

UNITED STATES PATENT AND TRADEMARK OFFICE
CERTIFICATE OF CORRECTION

PATENT NO. : 6,933,878 B1
DATED : August 23, 2005
INVENTOR(S) : Robert B. Molyneux-Berry It is certified that error appears in the above-identified patent and that said Letters Patent is hereby corrected as shown below:

Title page,
Item [*] Notice, should read:
-- [*] Notice: This patent application was filed prior to June 8, 1995, thus no Patent Term Extension or Adjustment applies. --.

Signed and Sealed this

Thirty-first Day of January, 2006

JON W. DUDAS
*Director of the United States Patent and Trademark Office*